(No Model.)

J. GOODFELLOW.
APPLIANCE FOR RAILWAY CARS.

No. 383,456. Patented May 29, 1888.

Witnesses:
John Buckle,
L. H. Osgood.

Inventor:
James Goodfellow,
By Worth Osgood
Attorney.

UNITED STATES PATENT OFFICE.

JAMES GOODFELLOW, OF NEW YORK, N. Y.

APPLIANCE FOR RAILWAY-CARS.

SPECIFICATION forming part of Letters Patent No. 383,456, dated May 29, 1888.

Application filed October 5, 1887. Serial No. 251,526. (No model.)

*To all whom it may concern:*

Be it known that I, JAMES GOODFELLOW, of the city, county, and State of New York, have invented certain new and useful Improvements in Appliances for Railway-Cars, of which the following is a full, clear, and exact description, reference being had to the accompanying drawings, and to the letters of reference marked thereon.

My improvements are chiefly designed for use upon cars drawn by animal-power; but obviously they may be used to advantage upon any car or similar vehicle.

The object of my invention is to provide a simple, cheap, efficient, and readily-operating appliance for the car, which will, when in use, prevent backward movement of the car, but at the same time leave it perfectly free to be moved forward at all times. To accomplish this, and to secure other advantages in the matter of construction, application, and use, my improvements involve certain new and useful peculiarities of construction, relative arrangements, or combinations of parts and principles of operation, all of which will be herein first fully described, and then pointed out in the claims.

Figure 1:
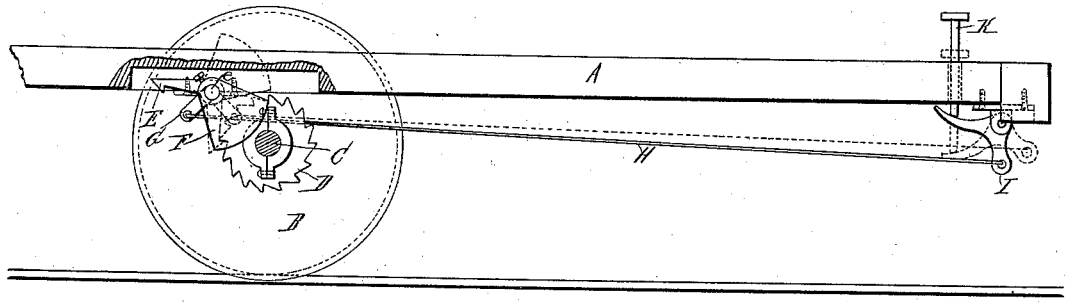
Figure 2:
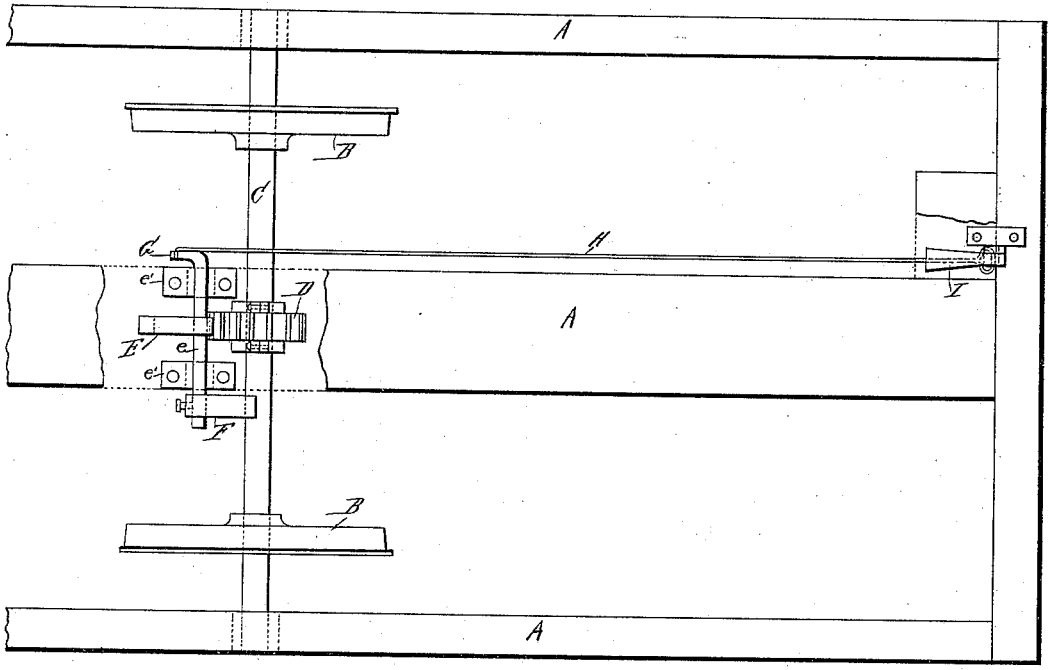

In the accompanying drawings, forming part of this specification, Figure 1 is a sectional elevation upon a plane passing through the car-axle representing one of my improved appliances in position in connection with the framework and car-axle, the dotted lines indicating the working position when brought into use to stop the backward movement. Fig. 2 is a plan or top view.

In both the figures like letters of reference, wherever they occur, indicate corresponding parts.

It has not been deemed necessary to represent more than an outline of the lower car-timbers or more than one of the car-axles, it being understood that the car may be of any construction, and that the appliance is located and arranged for the forward and rear axles, (which are generally alike,) if desired, and it is so preferred in all ordinary cases. The desirability of an appliance of this character is most apparent in connection with cars drawn by animal-power. For instance, in starting these cars upon an upgrade or with a heavy load, it has frequently been observed that the animals cannot be made to pull at the instant of releasing the brake, or that the brake cannot be released at the proper instant, or that the animals pull against the holding-power of the brake, or after having started the load permit it to recede,(before the brake can be applied,) either for lack of sufficient strength or for lack of willingness to proceed. For these and other reasons unnecessary work is alloted to the draft-animals: I overcome these objections by my improved appliance, which will now be described.

A A represent the lower timbers of a car or vehicle, which may be of any pattern.

B B are the wheels upon which the brake-blocks (not shown) are usually applied.

C is the axle, which turns with the wheels in boxes provided for it, and which supports one part of the car. Upon the axle C, and preferably about midway between the wheels, I key or otherwise secure a solid and substantial toothed wheel, D, of which the teeth are amply strong and spaced so as to afford little or no perceptible back movement after engagement of the pawl or dog therewith.

Upon some convenient part of the car-body or car-timbers I suspend the overhanging pawl or dog E. In the form shown this pawl is mounted upon a shaft, $e$, journaled at each end in suitable boxes, $e'$ $e'$, so that it may freely move, carrying the pawl into and out of engagement with the toothed wheel D. Upon one end of shaft $e$ is a counter-weight, F, so adjusted that as soon as the pawl is released from the tooth of wheel D it will instantly carry the pawl out of the way of the wheel and so maintain it until it is again forcibly brought down to its working position. Upon the end of shaft $e$, opposite the counter-weight or at some other convenient point, is a crank or arm, G, through which the shaft can be forcibly revolved when required, and thus the pawl turned down into working position.

H is a wire, cord, or chain connected with the arm or crank G, and leading therefrom to the end of the car, or to a position within convenient reach of the driver. To supply a simple means of applying the pawl to the toothed wheel, I secure the end of the line or chain H to and pass it beneath a pivoted block or arm, I, which bears the line taut at all times. Upon depressing the arm I it is plain that it will cause the line to turn the crank toward the front of the car, or in a direction to bring the pawl into operation. To depress the arm I, I supply a removable pin, as K, which may pass down through the car-floor or platform-floor and rest upon the arm I. When it is required to prevent any backward movement of the car, the driver touches the pin K with his foot, and this brings the pawl into proper operative position. If there be another appliance of similar character working in connection with the other axle, (and there should be,) the driver in changing from one end of the car to the other removes the pin K, carries it with him, and readjusts it at the other end.

The removable pin prevents any unauthorized interference with the running-gear of the car and should be applied, although the remainder of the appliance may be operated by any other means and still be within the scope of my invention.

Just as soon as the car starts the toothed wheel turns in such direction as to release the pawl, and then the counter-weight instantly turns it up out of the way of the toothed wheel, where it remains until required for use.

With this appliance the brake or brakes may be released and the car held against backward movement by the pawl and toothed wheel, when the car is perfectly free to be moved forward at any time, and may be started without interference by the brake or brakes.

The improved device is best adapted for use in connection with axles which turn with the car-wheels. If applied to wheels which turn upon their axles, obviously it should be applied to the hubs, and both wheels should be similarly arrested, else one might turn while the other was prevented.

The details of construction may be variously modified within the usual limits. The principle of the device is most serviceable in or on horse-cars and the like; but it will be found advantageous also for use on cars drawn by locomotive, and especially so on what are called "cable cars," the backward movement of which must be arrested before they can be started forward.

If the toothed wheel be applied to the axle before the car-wheels are located thereon, it may be forced on same as the car-wheels; but for old axles I prefer to divide the toothed wheel, as shown, so that it may be located and secured in place without difficulty.

Having now fully described my invention, what I claim as new, and desire to secure by Letters Patent, is—

1. In an appliance of the character herein set forth, the toothed wheel, the pawl or dog, the counter-weight, the crank, and the line, combined and arranged substantially as explained.

2. In an appliance of the character herein set forth, the combination, with the operating-line, of the hinged arm and the removable pin bearing thereon, substantially as explained.

3. The combination, as before set forth, of the toothed wheel, pawl, counter-weight, crank, operating-line, hinged arm, and removable pin, for the purposes explained.

In testimony that I claim the foregoing I have hereunto set my hand in the presence of two witnesses.

JAMES GOODFELLOW.

Witnesses:
JOHN BUCKLER,
WORTH OSGOOD.